United States Patent
Palos et al.

(10) Patent No.: US 10,685,485 B2
(45) Date of Patent: Jun. 16, 2020

(54) NAVIGATION IN AUGMENTED REALITY ENVIRONMENT

(71) Applicant: Google LLC, Mountain View, CA (US)

(72) Inventors: Xavier Benavides Palos, Mountain View, CA (US); Brett Barros, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 35 days.

(21) Appl. No.: 15/819,528

(22) Filed: Nov. 21, 2017

(65) Prior Publication Data
US 2019/0156573 A1 May 23, 2019

(51) Int. Cl.
| | |
|---|---|
| *G06T 19/00* | (2011.01) |
| *G06T 19/20* | (2011.01) |
| *G06K 9/32* | (2006.01) |
| *G06K 9/22* | (2006.01) |
| *G06F 3/01* | (2006.01) |
| *G06K 9/00* | (2006.01) |
| *G06F 3/03* | (2006.01) |
| *G06F 3/0346* | (2013.01) |

(52) U.S. Cl.
CPC ............ *G06T 19/003* (2013.01); *G06F 3/011* (2013.01); *G06F 3/0304* (2013.01); *G06F 3/0346* (2013.01); *G06K 9/00671* (2013.01); *G06K 9/22* (2013.01); *G06K 9/3275* (2013.01); *G06T 19/006* (2013.01); *G06T 19/20* (2013.01)

(58) Field of Classification Search
CPC ...... G06T 19/003; G06T 19/006; G06T 19/20
See application file for complete search history.

(56) References Cited

U.S. PATENT DOCUMENTS

| | | | |
|---|---|---|---|
| 8,810,599 B1* | 8/2014 | Tseng | G05D 1/0278 345/633 |
| 2011/0141254 A1* | 6/2011 | Roebke | G06T 19/006 348/61 |
| 2013/0073988 A1* | 3/2013 | Groten | G06Q 30/02 715/753 |
| 2013/0288719 A1 | 10/2013 | Alonzo et al. | |
| 2014/0063058 A1* | 3/2014 | Fialho | G06T 11/60 345/633 |
| 2014/0309925 A1 | 10/2014 | Morato et al. | |

(Continued)

OTHER PUBLICATIONS

TheUnproPro, "RPG Maker MV Plugins—Beautiful Minimap Update!",https://www.youtube.com/watch?v=eEWQE34JRZI, time 2:20, Aug. 15, 2016 (Year: 2016).*

(Continued)

*Primary Examiner* — Yu Chen
(74) *Attorney, Agent, or Firm* — Brake Hughes Bellermann LLP (57) ABSTRACT

A method includes: receiving, in a device, data defining an augmented reality (AR) environment, the data specifying a location of a first AR object in the AR environment; determining a physical inclination of the device; assigning a perception inclination to a map of the AR environment, the perception inclination based on the determined physical inclination; and triggering rendering of the map and an aspect of the AR environment on a display of the device, wherein the location of the first AR object is marked on the map and the map appears to have the perception inclination with regard to the display.

21 Claims, 8 Drawing Sheets

(56) References Cited

U.S. PATENT DOCUMENTS

2016/0153800 A1     6/2016   Ko
2016/0284125 A1*   9/2016   Bostick ................. G06T 19/006
2018/0164982 A1*   6/2018   Rakshit ............... G06F 3/04815

OTHER PUBLICATIONS

"Top Down 2D Game Setup", Unreal Engine, retrieved on Oct. 10, 2017 from https://docs.unrealengine.com/latest/INT/Engine/Paper2D/HowTo/TopDown/, 19 pages.

Breen, et al., "Interactive Occlusion and Collision of Real and Virtual Objects in Augmented Reality", Technical report ECRC-95-02, European Computer-Industry Research Centre, 1995, 22 pages.

Reitmayr, et al., "Collaborative Augmented Reality for Outdoor Navigation and Information Browsing", Conference Paper, Jan. 2004, 11 pages.

International Search Report and Written Opinion for International Application No. PCT/US2018/060944, dated Mar. 18, 2019, 14 pages.

\* cited by examiner

NAVIGATION IN AUGMENTED REALITY ENVIRONMENT

TECHNICAL FIELD

This document relates, generally, to navigation in an augmented reality environment.

BACKGROUND

In the context of computer-based consumption of media and other content, it is becoming increasingly common to provide the participant with immersive experiences. One field involves the presentation of virtual reality (VR) and/or augmented reality (AR) environments on a device such as a smartphone or a tablet. In an AR environment, a person can watch a screen that presents at least both an aspect of a physical environment (e.g., a video or image of a physical space) and an aspect of VR (e.g., a virtual object superimposed on the video or image).

SUMMARY

In a first aspect, a method includes: receiving, in a device, data defining an augmented reality (AR) environment, the data specifying a location of a first AR object in the AR environment; determining a physical inclination of the device; assigning a perception inclination to a map of the AR environment, the perception inclination based on the determined physical inclination; and triggering rendering of the map and an aspect of the AR environment on a display of the device, wherein the location of the first AR object is marked on the map and the map appears to have the perception inclination with regard to the display.

Implementations can include any or all of the following features. The method can further include continuously monitoring the physical inclination of the device, and adjusting the perception inclination based on the physical inclination. The adjusted perception inclination can be proportional to the continuously monitored physical inclination over at least an interval of physical inclinations. The method can further include determining that the physical inclination exceeds a threshold, and in response maintaining a current perception inclination for the map for as long as the physical inclination exceeds the threshold. The physical inclination can be determined with regard to a plane. Determining the physical inclination can include using an image sensor of the device. The physical inclination can be determined with regard to a vertical direction in a physical environment. The method can further include determining the vertical direction using an inertial measurement unit in the device. The method can further include placing on the map a first representation corresponding to the first AR object. The method can further include determining a distance between first and second physical locations, wherein the device is currently located at the first physical location and the second physical location corresponds to the location of the first AR object in the AR environment, and wherein the first representation is placed at a location on the map based on the determined distance. The method can further include determining a distance between first and second physical locations, wherein the device is currently located at the first physical location and the second physical location corresponds to the location of the first AR object in the AR environment, and wherein a size of the first representation on the map is based on the determined distance. The map can include a grid, and the method can further include determining a distance between first and second physical locations, wherein the device is currently located at the first physical location and the second physical location corresponds to the location of the first AR object in the AR environment, and adjusting a size of the grid based on the determined distance. The method can further include determining a distance between first and second physical locations, wherein the device is currently located at the first physical location and the second physical location corresponds to the location of the first AR object in the AR environment, the method further comprising adjusting a size of the map based on the determined distance. The AR environment can have defined therein a path to be followed by the device, the path leading to the first AR object and thereafter to a second AR object in the AR environment, the method further comprising placing a second representation corresponding to the second AR object on the map, and making the first representation larger than the second representation based on the path. The method can further include anonymizing the representation before the device reaches a physical location that corresponds to the location of the first AR object, and, in response to the device reaching the physical location, de-anonymizing the representation. The method can further include monitoring physical locations of the device over time, and generating a path on the map corresponding to the physical locations.

In a second aspect, a non-transitory storage medium can have stored thereon instructions that when executed are configured to cause a processor to perform operations, the operations comprising: receiving, in a device, data defining an augmented reality (AR) environment, the data specifying a location of a first AR object in the AR environment; determining a physical inclination of the device; assigning a perception inclination to a map of the AR environment, the perception inclination based on the determined physical inclination; and triggering rendering of the map and an aspect of the AR environment on a display of the device, wherein the location of the first AR object is marked on the map and the map appears to have the perception inclination with regard to the display.

In a third aspect, an apparatus can include: a memory having stored therein data defining an augmented reality (AR) environment, the data specifying a location of a first AR object in the AR environment; an orientation system configured for determining a physical inclination of the apparatus, wherein the apparatus assigns a perception inclination to a map of the AR environment, the perception inclination based on the determined physical inclination; and a display, wherein the apparatus renders the map and an aspect of the AR environment on the display, and wherein the location of the first AR object is marked on the map and the map appears to have the perception inclination with regard to the display.

In a fourth aspect, an apparatus can include: a memory having stored therein data defining an augmented reality (AR) environment, the data specifying a location of a first AR object in the AR environment; an orientation system configured for determining a physical inclination of the apparatus; a display that presents a map of the AR environment and an aspect of the AR environment; and means for maintaining a semantic significance of a direction on the map at least when the apparatus has respective first and second physical inclinations determined by the orientation system.

Implementations can include any or all of the following features. The means can maintain the semantic significance of the direction by assigning a first perception inclination to the map in response to the apparatus having the first physical inclination, and by assigning a second perception inclination to the map in response to the apparatus having the second physical inclination. The first perception inclination can be proportional to the first physical inclination, and wherein the second perception inclination is a constant perception inclination that is not proportional to the second physical inclination.

BRIEF DESCRIPTION OF DRAWINGS

Like reference symbols in the various drawings indicate like elements.

DETAILED DESCRIPTION

This document describes examples of providing navigation in an augmented reality (AR) environment, for example so as to aid a user holding a device on which the AR environment is being presented in moving around with the device when exploring the AR environment. In some implementations, the device can show both an aspect of the AR environment and a map of the AR environment. The map can indicate the location(s) of one or more objects in the AR environment. The user can hold the device in different positions during the exploration, such as parallel to the floor with the display facing upward, or in a vertical position with the display facing the user. The perceived inclination (e.g., the degree of a slope) of the map on the display can be altered based on the position of the device so as to help the user correlate a direction of movement on the map with the corresponding direction of movement in the physical environment. For example, the map can appear to be tilted differently on the display so as to help maintain the sense of which direction is forward.

Figure 1:
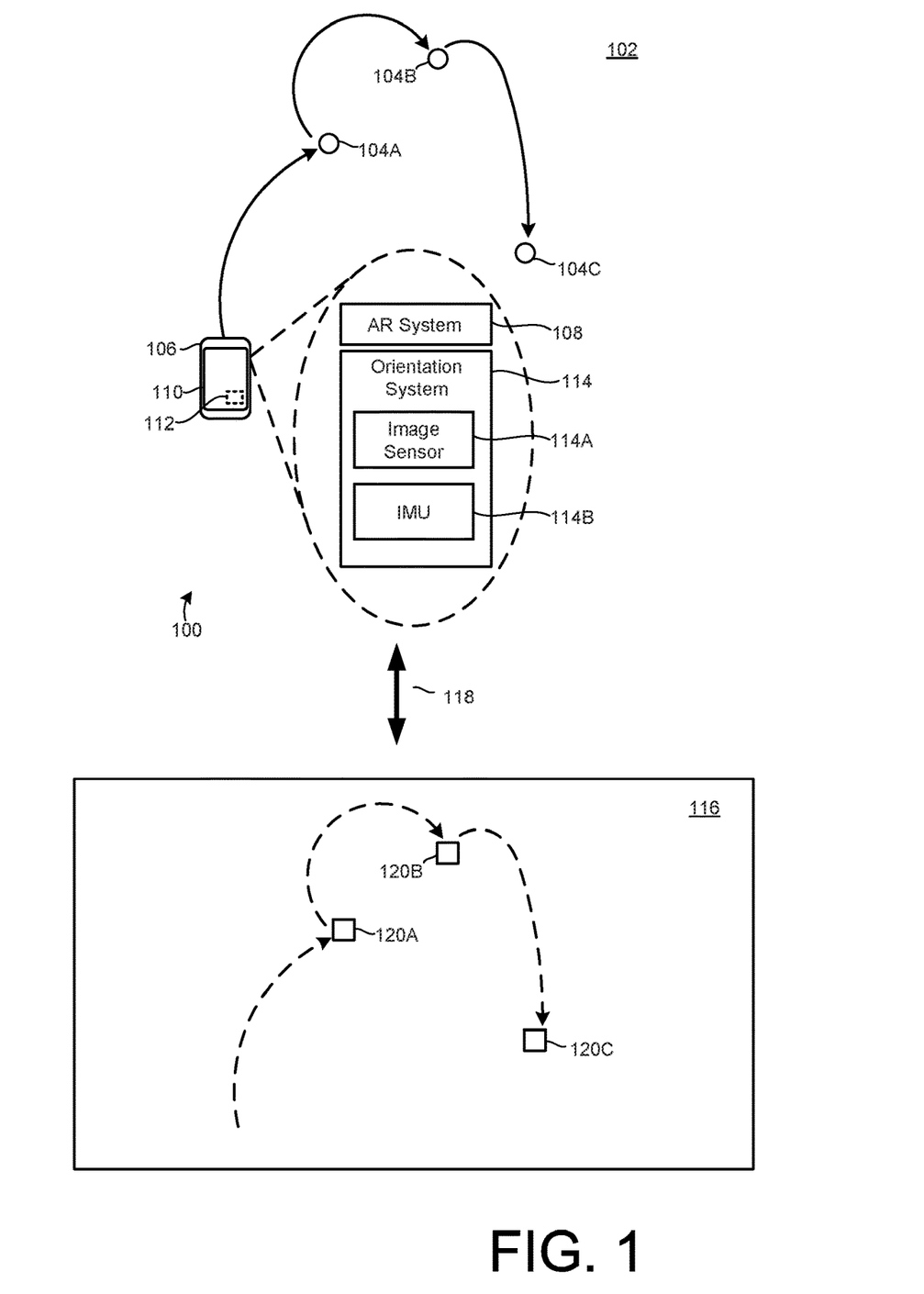
FIG. 1 shows an example of a system that can be used for generating an immersive experience by way of an augmented reality (AR) environment.

FIG. 1 shows an example of a system 100 that can be used for generating an immersive experience by way of an AR environment. In some implementations, the immersive experience allows the user (not shown) to see one or more AR objects in combination with imagery of physical reality. For example, the immersive experience can allow the user to explore the AR environment by holding a device while moving about in a physical space. Multiple AR objects can be positioned at respective locations in the AR environment relative to the physical reality, and the user can in a sense visit the locations of the AR objects by moving the device into corresponding physical locations. The physical location(s) can be monitored or otherwise determined using any available technology, including, but not limited to, optical, radio-based and/or acoustic position methodologies. Some implementations can also or instead be used in a virtual reality (VR) environment. For example, functionality described herein can be provided for observation on a head-mounted display, including, but not limited to, on the VR headset 1085 described below with reference to FIG. 10.

The system 100 is here shown in a space 102, which can be any kind of physical space, including, but not limited to, a room or other premises. The space 102 is here schematically shown from above. In some implementations, the space 102 contains one or more physical structures (not shown), and in some implementations, the space 102 contains no physical structures. The space 102 can be used as the background for an immersive experience, for example in that a user is invited to visit locations in the space 102 and there be presented with corresponding AR experiences displayed on a screen.

Multiple physical locations can have a particular relevance in the space 102. Here, physical locations 104A-C have been schematically indicated in the space 102. For example, the creator of the immersive experience may have decided that some or all of the physical locations 104A-C can be visited in the space 102. The user can visit any or all of the physical locations 104A-C, such as in a predefined order, or in a random order. The physical locations 104A-C can correspond to the virtual position of respective virtual objects that will be visible during the immersive experience, for example as will be described below.

One or more devices can be used to create the AR experience. Here, a device 106 is schematically shown in the space 102. Any kind of device can be used, including, but not limited to, a smartphone or a tablet device. For example, any device similar to those described below with reference to FIG. 10 can be used. The device 106 here includes an AR system 108. The AR system 108 can use any form of AR technology to sense the position of the device 106 in the space 102. In some implementations, markers in the space 102 can form a basis for the organization within the AR environment. For example, the AR system 108 can use light sensing (e.g., infrared light) and two or more lenses to generate a stereo vision in the space 102 in order to develop a stereoscopic understanding thereof that allows the AR system 108 to also extrapolate into positions of the space 102 to which there is currently no line-of-sight. In some implementations, the AR system 108 is executed partially on the device 106 and partially on one or more other devices (e.g., another handheld device or a cloud system).

The device 106 can include one or more display screens 110. In some implementations, the display screen can be a touchscreen. For example, the display screen 110 can present a map 112 that allows the user to overview an AR environment that is being explored during the immersive experience.

The device 106 can include an orientation system 114. The orientation system can serve to determine one or more aspects of the physical presence of the device 106 within the space 102. In some implementations, the orientation system 114 can determine a physical inclination of the device 106. For example, the orientation system 114 can include an image sensor 114A (e.g., a camera and/or an infrared (IR) sensor) and can capture images of at least part of the space 102 in order to determine how the device 106 is currently oriented. As another example, the orientation system 114 can include an inertial measurement unit (IMU) 114B (e.g., an accelerometer) that is used to sense how the device 106 is currently oriented. In some implementations, the orientation system 114, the image sensor 114A and/or the IMU 114B can be a native component in the device 106, such as a camera and/or IMU of a smartphone or tablet device.

An AR environment 116 is here schematically illustrated. The AR environment can be a virtual construct and can be stored in a memory, such as on the device 106. One or more aspects of the AR environment 116 can be presented on the display screen 110 of the device 106. For example, the user may only be presented with a part of the AR environment 116 at any given time. The presented aspect of the AR environment 116 can include imagery of a portion of physical reality (e.g., an image of the space 102) and imagery of one or more virtual objects. The map 112 can be visible on top of such a presented aspect of the AR environment 116. The present appearance of the AR environment 116 can in a sense depend on where in the space 102 the device 106 is currently located and/or on how it is oriented. This relationship between the AR environment 116 and the space 102 is here schematically represented by an arrow 118.

Here, AR objects 120A-C are shown. For example, the AR object 120A can correspond to the physical location 104A in the sense that when the device 106 is at the physical location 104A, the AR object 120A is presented on the display screen 110. Similarly, the AR object 120B can correspond to the physical location 104B, and the AR object 120C can correspond to the physical location 104C. In the AR environment 116, the AR objects 120A-C may not be dependent on any particular path of travel. Rather, the path taken by the device 106 in this example is only illustrative and is therefore indicated by dashed arrows in the AR environment 116.

Figure 2:
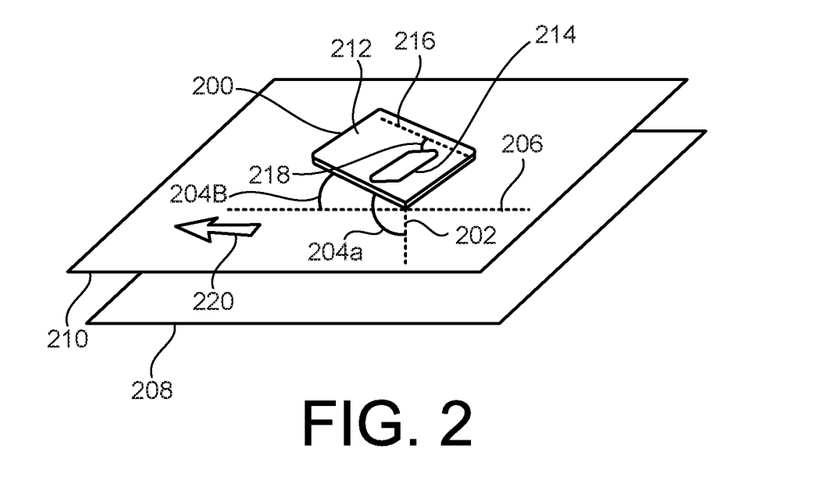
FIG. 2 schematically shows a relationship between a physical inclination and a perception inclination.

FIG. 2 schematically shows a relationship between a physical inclination and a perception inclination. Here, a device 200 is shown. In some implementations, the device 200 can be similar or identical to the device 106 (FIG. 1). The device 200 has one or more sensors (e.g., as part of an orientation system within the device 200) that facilitate determination of the orientation of the device 200. For example, an image sensor and/or an accelerometer can be used to determine a physical inclination of the device 200.

In some implementations, orientation can be determined relative to a vertical axis 202 in the physical environment, for example such that the vertical axis 202 is essentially parallel to the direction of the Earth's gravitational field. For example, an orientation system can determine or define (e.g., using an accelerometer) the vertical axis 202 and can then measure or calculate a physical inclination 204A of the device 200 with respect to the vertical axis 202.

In some implementations, orientation can be determined relative to a horizontal axis 206 in the physical environment, for example such that the horizontal axis 206 is essentially perpendicular to the direction of the Earth's gravitational field. For example, an orientation system can determine or define (e.g., using an accelerometer) the horizontal axis 206 and can then measure or calculate a physical inclination 204B of the device 200 with respect to the horizontal axis 206.

In some implementations, the orientation of the device 200 can be determined optically. For example, an image sensor can capture an image of a surface 208 (e.g., a floor or wall) within the physical environment. The horizontal axis 206 can then be defined to lie within a plane 210 that is parallel to the surface 208. For example, the physical inclination 204B of the device 200 can then be determined with respect to the plane 210.

The device 200 can include a display 212, including, but not limited to, a touchscreen display. An AR environment can be presented on the display 212. Such an AR environment can be provided with a map 214 that provides an overview of the AR environment beyond a particular aspect thereof that may currently be presented. The map 214 can be rendered on the display 212 so that it appears to have any perceived angle with respect to the display 212. For example, if a display axis 216 is considered to lie within the plane of the display 212, then the map 214 can be rendered so as to appear to have a perception inclination 218 with respect to the display axis 216. The user merely perceives the map 214 as having the perception inclination 218 whereas in fact the map 214, like all other content rendered on the display 212, is actually within the plane of the display 212. In some implementations, the perception inclination 218 is a visual effect that can be implemented by way of altering the proportions of the map 214. For example, in some situations, a particular foreshortening can be applied to the map 214, whereas in other situations a different foreshortening, or no foreshortening, may be applied.

The perception inclination 218 of the map 214 can help the user correlate a direction within the AR environment with a direction within the physical environment. For example, assume that an arrow 220 here corresponds to a forward direction relative to the user who is operating the device 200. During the course of an immersive experience, the physical inclination 204A/B of the device 200 can change, for example due to how the user is holding the device 200. In response to such a change in the physical inclination 204A/B, the perception inclination 218 may (or may not) change. For example, the perception inclination 218 can make it appear as if the map 214 has been angled away from the user. This can help maintain the notion of what direction on the map 214 corresponds to a forward direction in the physical environment, as here represented by the arrow 220. In some sense, the direction forward on the map 214 can look similar or the same to the user regardless of the current physical inclination 204A/B. As such, the perception inclination 218 applied to an item on the display 212 can serve to maintain a semantic significance of a direction on the map (e.g., a direction corresponding to the forward arrow 220) both when the physical inclination 204A/B has a first value (e.g., the device 200 is oblique to the plane 210), and when the physical inclination 204A/B has a second value (e.g., the device 200 is parallel to the plane 210).

The device 200 can continuously monitor the physical inclination 204A/B. In some implementations, an orientation system within the device 200 performs real-time measurements of the physical inclination of the device 200 and accordingly can continuously determine the current value(s) of the physical inclination 204A, or the physical inclination 204B, or both. As such, the perception inclination 218 can be adjusted based on a continuously monitored physical inclination 214A/B.

Figure 3:
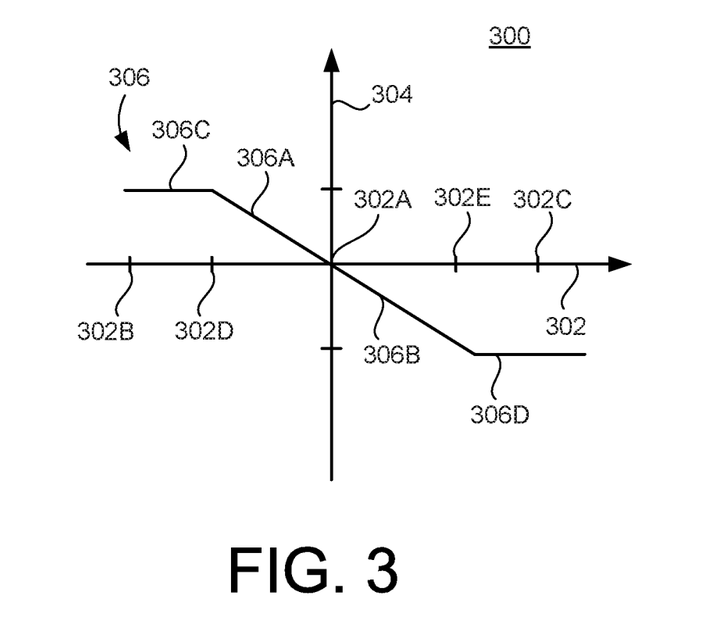
FIG. 3 shows an example of a graph of a relationship between a physical inclination and a perception inclination.

FIG. 3 shows an example of a graph 300 of a relationship between a physical inclination 302 and a perception inclination 304. The physical inclination 302 can be determined for any device or other apparatus described herein, including, but not limited to, those in FIGS. 1, 2 and 7B. The perception inclination 304 can be applied to any AR environment described herein, including, but not limited to, those in FIG. 1, 2, 4-5, 6A-B, 7A or 8.

The physical inclination 302 can be measured against any reference. For example, assume that the physical inclination 302 corresponds to the physical inclination 204B (FIG. 2)

which is measured against the horizontal axis 206. As such, the physical inclination 302 may have a value of zero at an origin 302A of the graph 300.

The perception inclination 304 can be measured against any reference. For example, assume that the perception inclination 304 corresponds to the perception inclination 218 (FIG. 2) which is measured against the display axis 216. As such, the perception inclination 304 may have a value of zero at the origin 302A.

A line 306 here indicates the value that the perception inclination 304 can be assigned based on the value of the physical inclination 302 between end points 302B-C. For example, at the end point 302B the device can be vertically oriented with the display facing away from the user, at the origin 302A the device can be horizontal with the display facing upward, and at the end point 302C the device can be vertically oriented with the display facing toward the user. The line 306 indicates that the relationship can be proportional and/or non-proportional. For example, a line 306A extends between a point 302D and the origin 302A; the perception inclination 304 can be proportional to the physical inclination 302 in this interval. Similarly, a line 306B extends between the origin 302A and a point 302E indicates that the perception inclination 304 can be proportional to the physical inclination 302 in this interval. As another example, a line 306C extends between the end point 302B and the origin 302A; the perception inclination 304 can be non-proportional to the physical inclination 302 (e.g., a constant perception inclination) in this interval. Similarly, a line 306D extends between the point 302E and the end point 302C indicates that the perception inclination 304 can be non-proportional to the physical inclination 302 (e.g., constant) in this interval.

In a sense, the point 302D and/or 302E can be considered as a threshold between proportionality and non-proportionality. For example, an AR system can determine that the physical inclination 302 exceeds the threshold of the point 302E, and therefor the AR system can maintain the perception inclination 304 at its current level (e.g., according to the line 306D) for as long as the physical inclination 302 exceeds the threshold.

The perception inclination 304 applied to a map in an AR environment can serve to maintain a semantic significance of a direction on the map (e.g., a forward direction in a physical environment) both when the physical inclination 302 has a first value (e.g., at the origin 302A), and when the physical inclination 302 has a second value (e.g., within the interval between the origin 302A and the point 302E).

Figure 4:
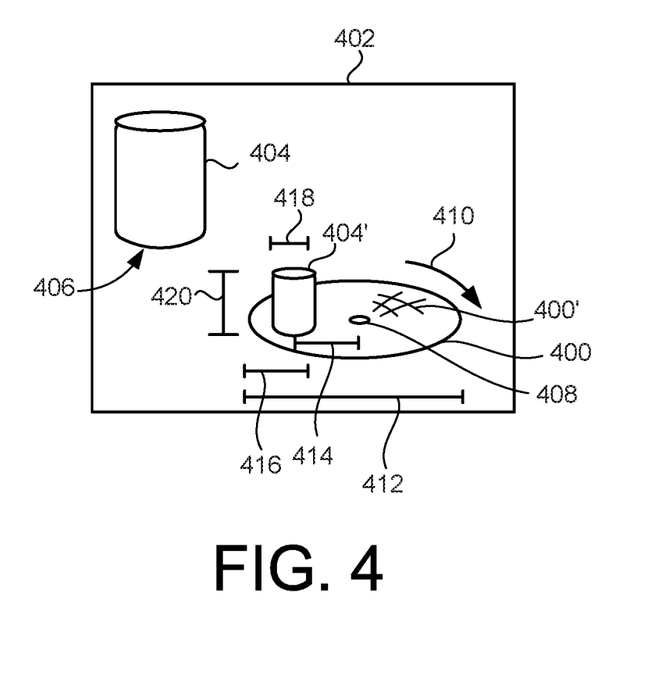
FIG. 4 shows an example of a map in an AR environment.

FIG. 4 shows an example of a map 400 in an AR environment 402. The AR environment 402 can be, or be included with, any AR environment described herein, including, but not limited to, those in FIG. 1, 2, 5, 6A-B, 7A or 8. The map 400 can indicate the location(s) of one or more AR objects in the AR environment. The AR environment 402 here includes an AR object 404 positioned at a location 406. The location 406 in the AR environment 402 can correspond to a particular location within a physical environment, for example as described above with reference to FIG. 1.

The map 400 allows the user to get an overview of at least part of the AR environment 402. Here a representation 404' corresponding to the AR object 404 is placed on the map 400. A center 408 of the map 400 can correspond to the current position of the device (e.g., a portable device held by the user). As the user explores the AR environment 402, the map 400 can be adjusted. For example, a rotation 410 in either direction can be applied to the map 400. A size 412 of the map 400 can be adjusted, for example to make the map 400 larger or smaller within the AR environment 402. The map 400 can have a grid 400' applied thereto. For example, the grid 400' is a periodic pattern applied to the map 400 to aid the user in gauging distances and/or speed of movement within the AR environment 402.

One or more changes can be applied to the representation 404' as the user explores the AR environment 402. In some implementations, the location of the representation 404' on the map 400 can be changed. For example, a distance 414 between the representation 404' and the center 408, and/or a distance 416 between the representation 404' and the edge of the map 400, can be changed. In some implementations, a size of the representation 404' can be changed. For example, a width 418 and/or a height 420 of the representation 404' can be changed.

A perception inclination of the map 400 can be altered. For example, assume that the AR environment 402 is presented on a device that is currently held essentially in a vertical position. The map 400 can therefore be rendered in a perspective view, for example so that a forward direction on the map 400 is easily correlated to a forward direction in the physical environment.

Examples described herein can illustrate performance of a method that involves receiving, in a device, data defining an AR environment. For example, the device 106 (FIG. 1) can receive data defining the AR environment 402. Such data can specify a location of an AR object in the AR environment, such as the location 406 (FIG. 4) for the AR object 404. The method can include determining a physical inclination of the device. For example, the physical inclination 302 (FIG. 3) can be determined for the device 106. A perception inclination can be assigned to a map of the AR environment. For example, the perception inclination 304 (FIG. 3) can be assigned to the map 400 (FIG. 4). The perception inclination can be based on the determined physical inclination. For example, the relationship of the graph 300 (FIG. 3) can be used. The method can include triggering rendering of the map and an aspect of the AR environment on a display of the device. For example, the device 106 can display the map 112 and an aspect of the AR environment 402. The location of AR object can be marked on the map and the map can appear to have the perception inclination with regard to the display. For example, the map 214 (FIG. 2) can appear to be tilted relative to the display axis 216.

Examples described herein can illustrate an apparatus that includes a memory having stored therein data defining an AR environment, the data specifying a location of a first AR object in the AR environment. For example, a memory of the device 106 (FIG. 1) can contain data defining the AR environment 402 (FIG. 4), with the data specifying the location 406 of the AR object 404. The apparatus can include an orientation system configured for determining a physical inclination of the apparatus. For example, the orientation system 114 (FIG. 1) can determine the physical inclination 204A/B (FIG. 2) of the device 200. The apparatus can assign a perception inclination to a map of the AR environment. For example, the device 106 (FIG. 1) can assign the perception inclination 218 (FIG. 2) to the map 400 (FIG. 4) of the AR environment 402. The perception inclination can be based on the determined physical inclination. For example, the relationship of the graph 300 (FIG. 3) can be used.

FIGS. 5A-F show another example of a map 500 in an AR environment 502. A center 504 of the map 500 corresponds to the position of the device. A representation 506 of an AR object (not shown) is placed on the map 500. For example, the AR object is a person or a mannequin in the AR environment 502 and the representation 506 can resemble the person or mannequin.

Figure 5A:
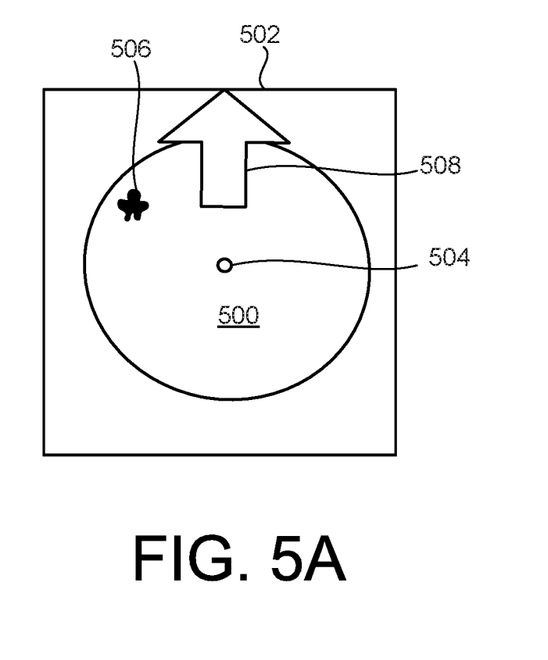
FIGS. 5A-F show another example of a map in an AR environment.
Figure 5B:
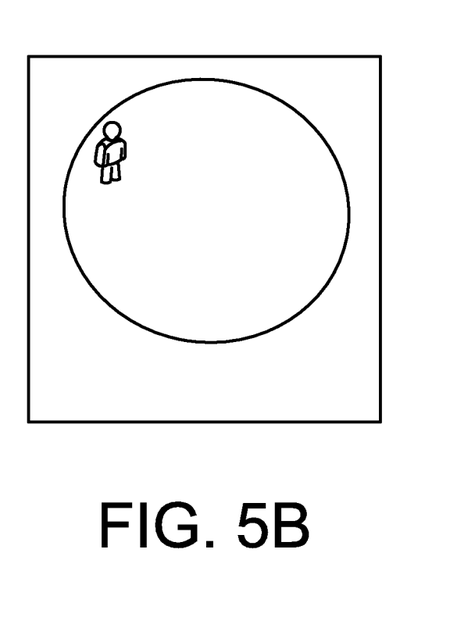
Figure 5C:
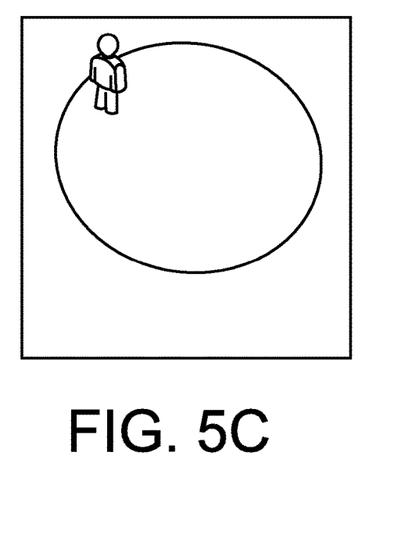
Figure 5D:
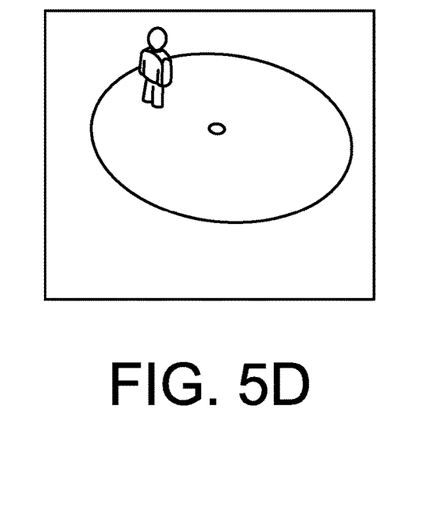
Figure 5E:
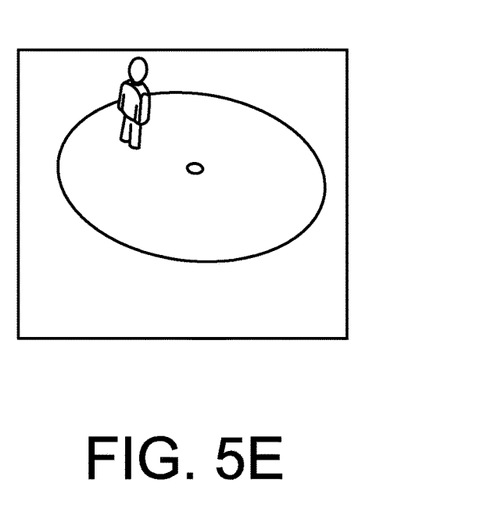
Figure 5F:
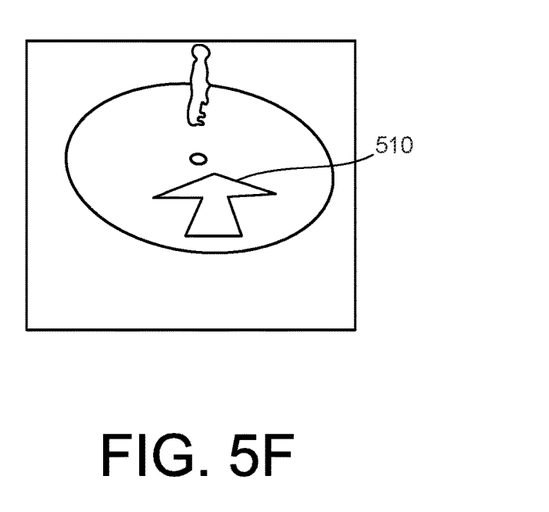

In the example of FIG. 5A, the device may be in or near a horizontal position with the display facing upward. For example, this can facilitate that a camera of the device is directed downward and provides an image of the floor as part of the AR environment 502. Because of the (essentially) horizontal orientation, the map 500 may have zero or little perception inclination relative to the display where the AR environment 502 is being presented. The map 500 can therefore appear essentially circular. Other shapes of the map 500 can be used.

In the examples of FIGS. 5B-F, the device may gradually be raised from the (near-)horizontal position to a more upright position. For example, in the example shown in FIG. 5F the device may be in or near a vertical position with the display facing toward the user. For example, this can facilitate that a camera of the device is directed in the direction that the user is looking (and optionally walking) and provides an ambient image of the physical environment as part of the AR environment 502. The map 500 can therefore appear oval. For example, the map 500 may have gradually transitioned from the circular shape shown in FIG. 5A toward an increasingly oval shape, until a threshold of physical inclination is reached (analogous to the point 302E in FIG. 3) after which the map 500 may not change in response to greater physical inclination.

The perception inclination applied to the map 500 in the AR environment 502 can serve to maintain a semantic significance of a direction on the map 500 (e.g., a forward direction in a physical environment) both when the physical inclination is as shown in FIG. 5A and when the physical inclination is as shown in any or all of FIGS. 5B-F. For example, an arrow 508 in FIG. 5A and an arrow 510 in FIG. 5F can both correspond to a forward direction in the physical environment, thus maintaining the semantic significance of the forward direction.

Figure 6A:
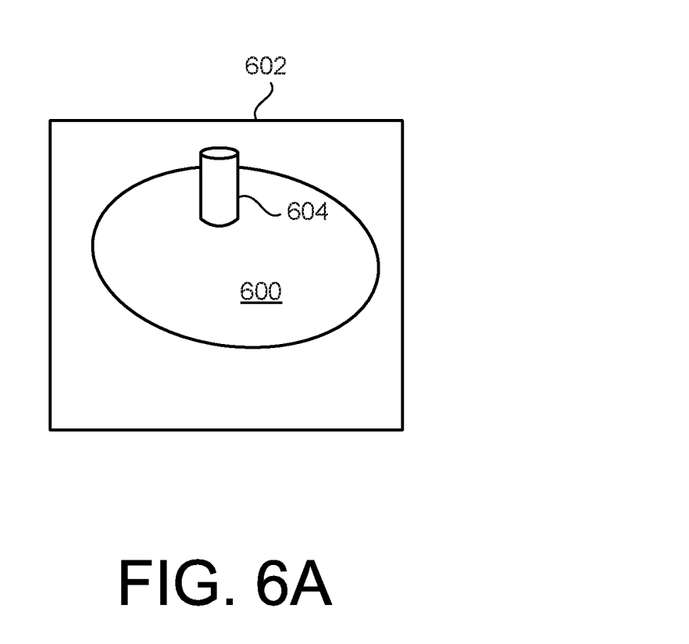
FIGS. 6A-B show another example of a map in an AR environment.
Figure 6B:
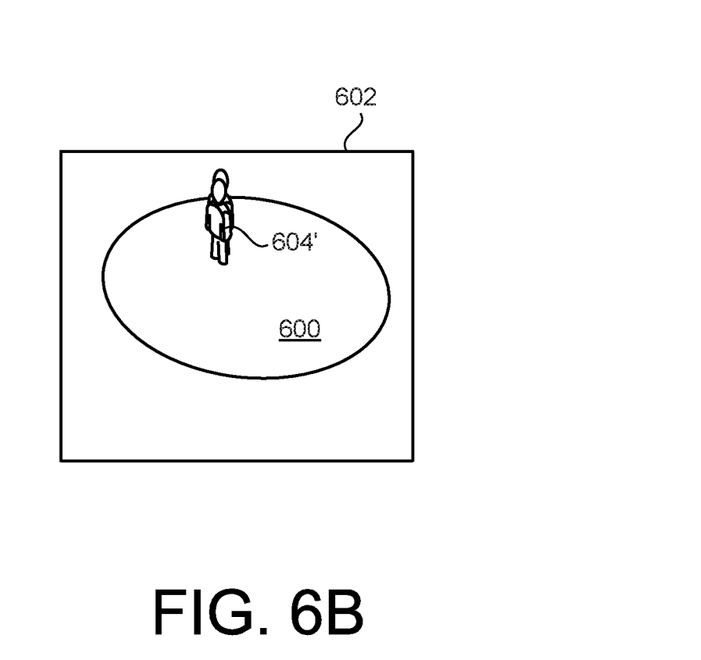

FIGS. 6A-B show another example of a map 600 in an AR environment. Here, a hidden representation 604 is placed on the map 600. The hidden representation 604 can be an anonymized version of an AR object that the user can visit in the AR environment 602. However, at the present time, the hidden representation 604 does not reveal to the user what the AR object looks like. When the user carrying the device on which the AR environment 602 is present reaches the physical location that corresponds to the location of the AR object in the AR environment 602, the hidden representation 604 can be de-anonymized. For example, this can involve removing the hidden representation 604 from the map 600 and instead placing a representation 604', resembling the AR object, on the map 600.

Figure 7A:
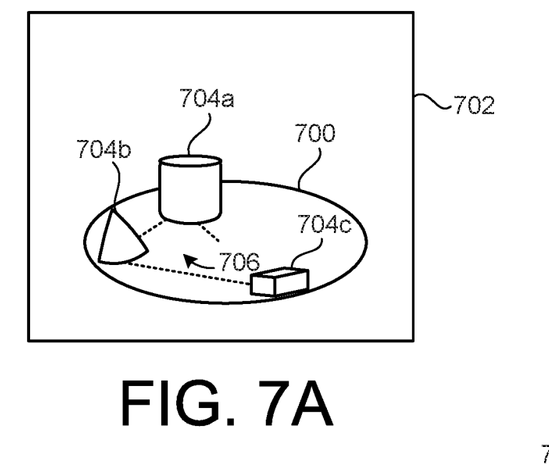
FIG. 7A shows another example of a map in an AR environment.

FIG. 7A shows another example of a map 700 in an AR environment 702. The AR environment 702 can be, or be included with, any AR environment described herein, including, but not limited to, those in FIG. 1, 2, 4, 5, 6A-B or 8. The AR environment 702 also includes AR objects having respective representations 704A-C placed on the map 700. A path 706 that connects the representations 704A-C according to a sequence can be defined in the AR environment 702.

Figure 7B:
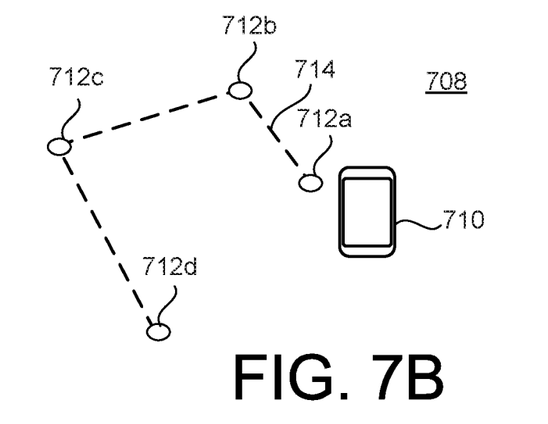
FIG. 7B schematically shows a physical environment related to the AR environment in FIG. 7A.

FIG. 7B schematically shows a physical environment 708 related to the AR environment 702 in FIG. 7A. The relationship can be similar to that described above with reference to FIG. 1. Here, a device 710 is present in the physical environment 708. Physical locations 712A-D are indicated. For example, the physical location 712A is where the device 710 is presently located and corresponds to the center of the map 700. If the device is brought to the respective physical locations 712B-D, the user can observe in the AR environment 702 the respective AR objects corresponding to the representations 704A-C.

For example, the path 706 can be defined in the AR environment 702 to be followed by the device 710. The path 706 can lead to the AR object of the representation 704A and thereafter to the AR object of the representation 704B. The representation 704A can be made larger than the representation 704B based on the path reaching the AR object of the representation 704A before reaching the AR object of the representation 704B.

For example, a distance 714 between the physical locations 712A and 712B can be determined. Here, the device 710 is currently located at the physical location 712A and the physical locations 712B corresponds to the location of the AR object of the representation 704A. The representation 704A can be placed at a location on the map 700 based on the determined distance 714. As another example, a size of the representation 704A can be based on the determined distance 714. As another example, a size of the map 700 can be adjusted based on the determined distance 714.

The map 700 can include a grid (e.g., similar to the grid 400' in FIG. 4). A size of the grid can be adjusted based on the determined distance.

Figure 8:
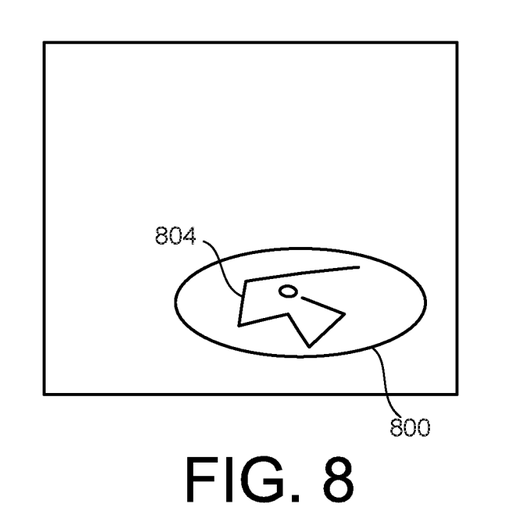
FIG. 8 shows another example of a map in an AR environment.

FIG. 8 shows another example of a map 800 in an AR environment. The AR environment 802 can be, or be included with, any AR environment described herein, including, but not limited to, those in FIG. 1, 2, 4, 5, 6A-B or 7A. The physical location of the device that is presenting the AR environment 802 can be continuously monitored. A path 804 can be generated on the map 800 corresponding to the physical location(s) registered in the monitoring. As such, the path 804 can indicate where the user has been earlier in the AR session.

Figure 9:
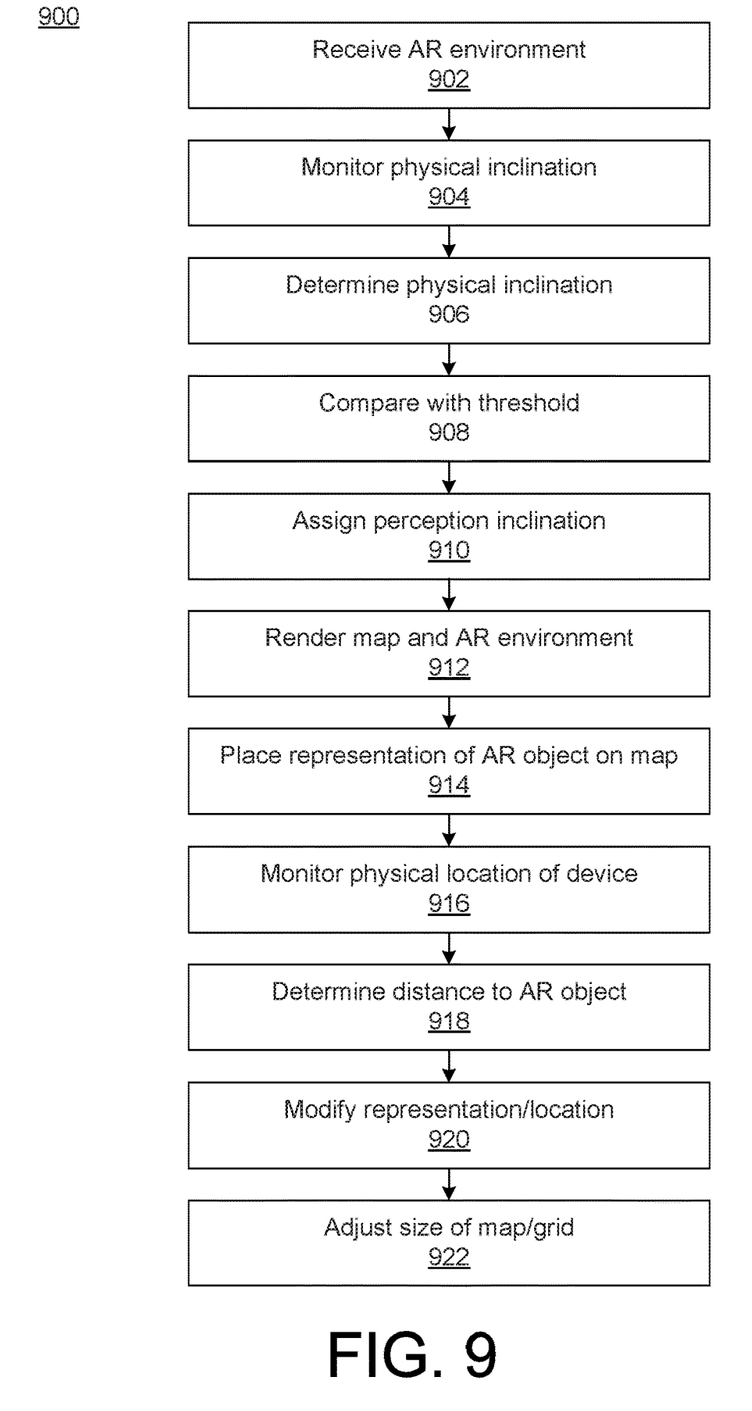
FIG. 9 shows an example of a method.

FIG. 9 shows an example of a method 900. Any or all operations of a method can be performed using one or more processors executing instructions stored in a non-transitory storage medium, for example as described below. In some implementations, more or fewer operations than shown can be performed. In some implementations, two or more operations can be performed in a different order. Some components introduced elsewhere in this disclosure will be mentioned in the following description, solely for purposes of illustration.

At 902, an AR environment can be received. For example, the device 106 (FIG. 1) can receive the AR environment 116.

At 904, a physical inclination can be monitored. The monitoring can be continuous or non-continuous. For example, the orientation system 114 (FIG. 1) can monitor the orientation of the device 106.

At 906, a physical inclination of the device can be determined. For example, the determination can be made based on the monitoring done at 904.

At 908, the determined physical inclination can be compared with a threshold. For example, one or more of the physical inclinations 302 (FIG. 3) can be compared with the point 302E.

At 910, a perception inclination can be assigned to an AR object. For example, the perception inclination 218 (FIG. 2) can be assigned to the map 214.

At 912, rendering of the map and an AR environment on a display can be triggered. For example, rendering of the map 400 (FIG. 4) and the AR environment 402 on the display screen 110 (FIG. 1) can be triggered by software on the device 106.

At 914, a representation of an AR object can be placed on the map. For example, the representation 404' (FIG. 4) of the AR object 404 can be placed on the map 400.

At 916, the physical location of the device can be monitored. For example, the physical location of the device 710 (FIG. 7B) can be monitored.

At 918, a distance to an AR object can be determined. For example, the distance 714 between the physical locations 712A and 712B can be determined.

At 920, a representation and/or the location of the representation can be modified in response to the distance determination done at 918. For example, the representation 404' (FIG. 4) and/or the location of the representation 404' can be modified.

At 922, a size of the map and/or a grid on the map can be adjusted in response to the distance determination done at 918. For example, the size of the map 400 (FIG. 4) and/or the size of the grid 400' can be adjusted.

Figure 10:
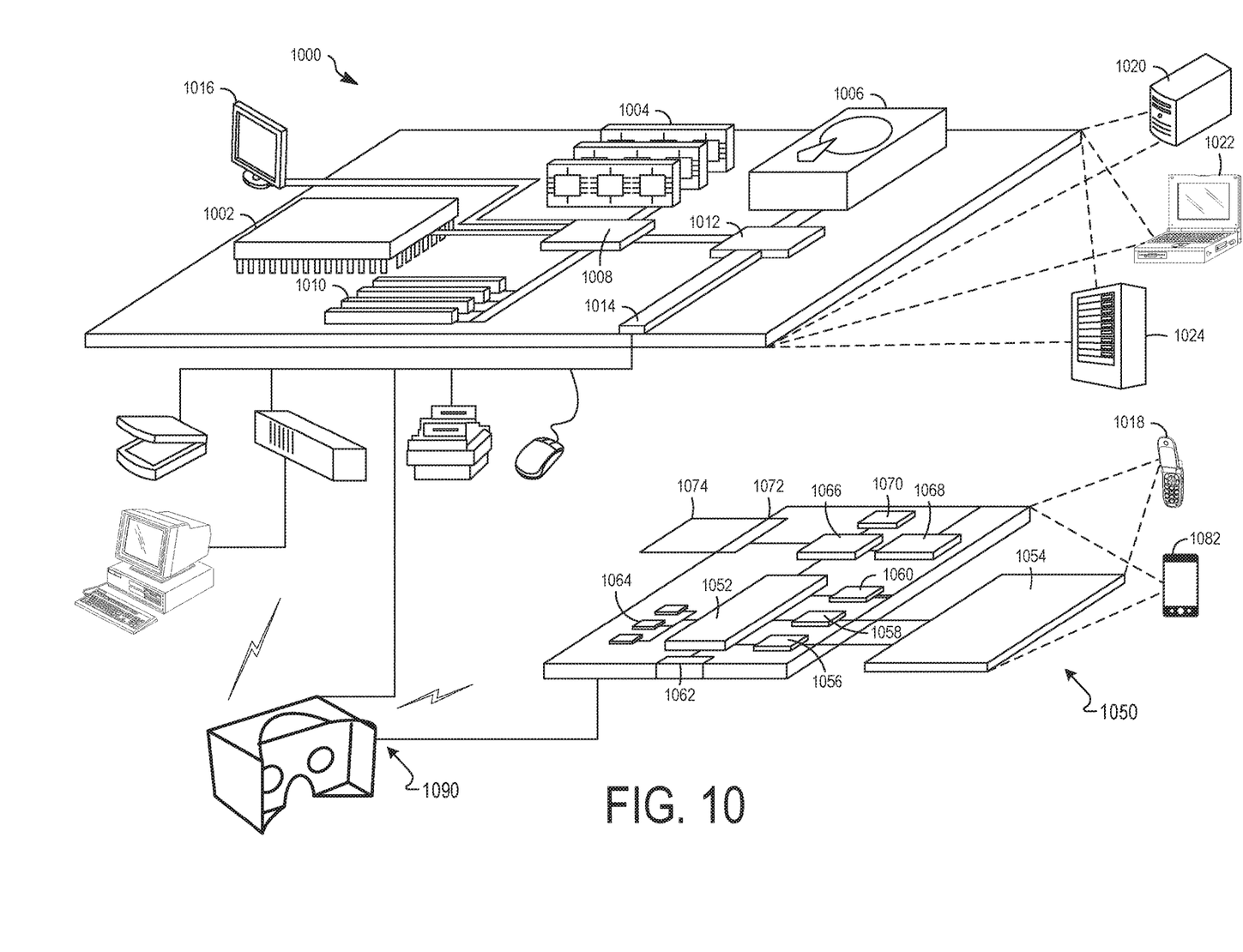
FIG. 10 shows an example of a computer device and a mobile computer device consistent with disclosed embodiments.

FIG. 10 shows an example of a computer device and a mobile computer device that can be used to implement the techniques described here. FIG. 10 shows an example of a generic computer device 1000 and a generic mobile computer device 1050, which may be used with the techniques described here. Computing device 1000 is intended to represent various forms of digital computers, such as laptops, desktops, tablets, workstations, personal digital assistants, televisions, servers, blade servers, mainframes, and other appropriate computing devices. Computing device 1050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. The processor 1002 can be a semiconductor-based processor. The memory 1004 can be a semiconductor-based memory. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smart phone 1082, personal digital assistant, or other similar mobile device.

A user can interact with a computing device using a tracked controller 1084. In some implementations, the controller 1084 can track the movement of a user's body, such as of the hand, foot, head and/or torso, and generate input corresponding to the tracked motion. The input can correspond to the movement in one or more dimensions of motion, such as in three dimensions. For example, the tracked controller can be a physical controller for a VR application, the physical controller associated with one or more virtual controllers in the VR application. As another example, the controller 1084 can include a data glove.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 10 can include sensors that interface with a virtual reality (VR headset 1085). For example, one or more sensors included on a computing device 1050 or other computing device depicted in FIG. 10, can provide input to VR headset 1085 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 1050 can use the sensors to determine an absolute position and/or a detected rotation of the computing device in the VR space that can then be used as input to the VR space. For example, the computing device 1050 may be incorporated into the VR space as a virtual object, such as a controller, a laser pointer, a keyboard, a weapon, etc. Positioning of the computing device/virtual object by the user when incorporated into the VR space can allow the user to position the computing device to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 1050 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1050 when the computing device is incorporated into the VR space can cause a particular action to occur in the VR space.

In some implementations, a touchscreen of the computing device 1050 can be rendered as a touchpad in VR space. A user can interact with the touchscreen of the computing device 1050. The interactions are rendered, in VR headset 1085 for example, as movements on the rendered touchpad in the VR space. The rendered movements can control objects in the VR space.

In some implementations, one or more output devices included on the computing device 1050 can provide output and/or feedback to a user of the VR headset 1085 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 1050 may appear as another object in a computer-generated, 3D environment. Interactions by the user with the computing device 1050 (e.g., rotating, shaking, touching a touchscreen, swiping a finger across a touch screen) can be interpreted as interactions with the object in the VR space. In the example of the laser pointer in a VR space, the computing device 1050 appears as a virtual laser pointer in the computer-generated, 3D environment. As the user manipulates the computing device 1050, the user in the VR space sees movement of the laser pointer. The user receives feedback from interactions with the computing device 1050 in the VR space on the computing device 1050 or on the VR headset 1085.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
receiving, in a device, data defining an augmented reality (AR) environment, the data specifying a location of a first virtual object in the AR environment;
determining a physical inclination of the device;
assigning a perception inclination to a map depicting at least a part of the AR environment, the perception inclination based on the determined physical inclination;
triggering rendering of the map and an aspect of the AR environment on a display of the device, wherein the first virtual object is visible in the aspect of the AR environment, wherein a first virtual representation of the first virtual object is included in the map, the first virtual representation resembling the first virtual object, and wherein the map appears to have the perception inclination with regard to the display; and
anonymizing the first virtual representation before the device reaches a physical location that corresponds to the location of the first virtual object such that an anonymized version of the first representation is included in the map, and, in response to the device reaching the physical location, de-anonymizing the first virtual representation such that the first virtual representation is included in the map.

2. The method of claim 1, further comprising continuously monitoring the physical inclination of the device, and adjusting the perception inclination based on the physical inclination.

3. The method of claim 2, wherein the adjusted perception inclination is proportional to the continuously monitored physical inclination over at least an interval of physical inclinations.

4. The method of claim 1, further comprising determining that the physical inclination exceeds a threshold, and in response maintaining a current perception inclination for the map for as long as the physical inclination exceeds the threshold.

5. The method of claim 1, wherein the physical inclination is determined with regard to a plane.

6. The method of claim 5, wherein determining the physical inclination comprises using an image sensor of the device.

7. The method of claim 1, wherein the physical inclination is determined with regard to a vertical direction in a physical environment.

8. The method of claim 7, further comprising determining the vertical direction using an inertial measurement unit in the device.

9. The method of claim 1, further comprising determining a distance between first and second physical locations, wherein the device is currently located at the first physical location and the second physical location corresponds to the location of the first virtual object in the AR environment, and wherein the first representation is placed at a location on the map based on the determined distance.

10. The method of claim 1, further comprising determining a distance between first and second physical locations, wherein the device is currently located at the first physical location and the second physical location corresponds to the location of the first virtual object in the AR environment, and wherein a size of the first representation on the map is based on the determined distance.

11. The method of claim 1, wherein the map includes a grid, the method further comprising determining a distance between first and second physical locations, wherein the device is currently located at the first physical location and the second physical location corresponds to the location of the first virtual object in the AR environment, and adjusting a size of the grid based on the determined distance.

12. The method of claim 1, further comprising determining a distance between first and second physical locations, wherein the device is currently located at the first physical location and the second physical location corresponds to the location of the first virtual object in the AR environment, the method further comprising adjusting a size of the map based on the determined distance.

13. The method of claim 1, wherein the AR environment has defined therein a path to be followed by the device, the path leading to the first virtual object and thereafter to a second virtual object in the AR environment, the method further comprising placing a second representation corresponding to the second virtual object on the map, and making the first representation larger than the second representation based on the path.

14. The method of claim 1, further comprising monitoring physical locations of the device over time, and generating a path on the map corresponding to the physical locations.

15. The method of claim 1, wherein triggering rendering of the map on the display comprises a picture-in-picture representation of at least the aspect of the AR environment.

16. A non-transitory storage medium having stored thereon instructions that when executed are configured to cause a processor to perform operations, the operations comprising:
   receiving, in a device, data defining an augmented reality (AR) environment, the data specifying a location of a first virtual object in the AR environment;
   determining a physical inclination of the device;
   assigning a perception inclination to a map depicting at least a part of the AR environment, the perception inclination based on the determined physical inclination;
   triggering rendering of the map and an aspect of the AR environment on a display of the device, wherein the first virtual object is visible in the aspect of the AR environment, wherein a first virtual representation of the first virtual object is included in the map, the first virtual representation resembling the first virtual object, and wherein the map appears to have the perception inclination with regard to the display; and
   anonymizing the first virtual representation before the device reaches a physical location that corresponds to the location of the first virtual object such that an anonymized version of the first representation is included in the map, and, in response to the device reaching the physical location, de-anonymizing the first virtual representation such that the first virtual representation is included in the map.

17. An apparatus comprising:
   a memory having stored therein data defining an augmented reality (AR) environment, the data specifying a location of a first virtual object in the AR environment;
   an orientation system configured for determining a physical inclination of the apparatus, wherein the apparatus assigns a perception inclination to a map depicting at least a part of the AR environment, the perception inclination based on the determined physical inclination; and
   a display, wherein the apparatus renders the map and an aspect of the AR environment on the display, wherein the first virtual object is visible in the aspect of the AR environment, wherein a first virtual representation of the first virtual object is included in the map, the first virtual representation resembling the first virtual object, and wherein the map appears to have the perception inclination with regard to the display; wherein the first virtual representation is anonymized before the apparatus reaches a physical location that corresponds to the location of the first virtual object such that an anonymized version of the first representation is included in the map, and wherein, in response to the apparatus reaching the physical location, the first virtual representation is de-anonymized such that the first virtual representation is included in the map.

18. The apparatus of claim 17, further comprising:
   an image sensor;
   an AR system configured to render the map and the aspect of the AR environment on the display using at least one image from the image sensor; and
   an inertial measurement unit (IMU);
   wherein the orientation system is configured to use the image sensor and the IMU to sense an orientation of the apparatus.

19. An apparatus comprising:
   a memory having stored therein data defining an augmented reality (AR) environment, the data specifying a location of a first virtual object in the AR environment;
   an orientation system configured for determining a physical inclination of the apparatus;
   a display that presents a map depicting at least a part of the AR environment and an aspect of the AR environment, wherein the first virtual object is visible in the aspect of the AR environment, wherein a first virtual representation of the first virtual object is included in the map, the first virtual representation resembling the first virtual object; and
   means for maintaining a semantic significance of a direction on the map at least when the apparatus has respective first and second physical inclinations determined by the orientation system;
   wherein the first virtual representation is anonymized before the apparatus reaches a physical location that corresponds to the location of the first virtual object such that an anonymized version of the first representation is included in the map, and wherein, in response to the apparatus reaching the physical location, the first virtual representation is de-anonymized such that the first virtual representation is included in the map.

20. The apparatus of claim 19, wherein the means maintains the semantic significance of the direction by assigning a first perception inclination to the map in response to the apparatus having the first physical inclination, and by assigning a second perception inclination to the map in response to the apparatus having the second physical inclination.

21. The apparatus of claim 20, wherein the first perception inclination is proportional to the first physical inclination, and wherein the second perception inclination is a constant perception inclination that is not proportional to the second physical inclination.

\* \* \* \* \*